(12) United States Patent
Li et al.

(10) Patent No.: US 10,764,195 B2
(45) Date of Patent: *Sep. 1, 2020

(54) DATA PACKET PROCESSING METHOD, APPARATUS, AND SYSTEM IN SOFTWARE DEFINED NETWORK SDN

(71) Applicant: Huawei Technologies Co., Ltd., Shenzhen (CN)

(72) Inventors: Quancai Li, Hangzhou (CN); Jianyao Liang, Hangzhou (CN); Fengwei Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,356

(22) Filed: Nov. 13, 2018

(65) Prior Publication Data

US 2019/0081901 A1 Mar. 14, 2019

Related U.S. Application Data

(63) Continuation of application No. 15/425,663, filed on Feb. 6, 2017, now Pat. No. 10,200,289, which is a
(Continued)

(30) Foreign Application Priority Data

Aug. 6, 2014 (WO) ................ PCT/CN2014/083804

(51) Int. Cl.
*H04L 12/851* (2013.01)
*H04L 12/721* (2013.01)

(52) U.S. Cl.
CPC .......... *H04L 47/2441* (2013.01); *H04L 45/38* (2013.01); *H04L 47/2483* (2013.01)

(58) Field of Classification Search
CPC combination set(s) only.
See application file for complete search history.

(56) References Cited

U.S. PATENT DOCUMENTS 8,605,734 B2 12/2013 Ichino
9,769,054 B2 9/2017 Wang
(Continued)

FOREIGN PATENT DOCUMENTS

CN 102349268 A 2/2012
CN 103166866 A 6/2013
(Continued)

OTHER PUBLICATIONS

Machine Translation and Abstract of Chinese Publication No. CN103401784, Nov. 20, 2013, 22 pages.
(Continued)

*Primary Examiner* — Eunsook Choi
(74) *Attorney, Agent, or Firm* — Conley Rose, P.C.

(57) ABSTRACT

A method executed by a control device in a software defined network where, according to the method, after establishing a control channel with a switching device, the control device obtains an identifier of the control channel. Then, the control device generates a flow entry, where the flow entry includes a match field and the identifier of the control channel. Further, the control device sends the flow entry to the switching device, where the flow entry is used to instruct the switching device to send, to the control device using the control channel represented by the identifier of the control channel, a data packet that matches the match field. Hence, classification of a new flow is completed on a switching device side.

14 Claims, 7 Drawing Sheets

Related U.S. Application Data continuation of application No. PCT/CN2014/094128, filed on Dec. 17, 2014.

(56) References Cited

U.S. PATENT DOCUMENTS

| | | |
|---|---|---|
| 2011/0261825 A1 | 10/2011 | Ichino |
| 2013/0163427 A1 | 6/2013 | Beliveau et al. |
| 2013/0176889 A1 | 7/2013 | Ogawa |
| 2013/0250958 A1 | 9/2013 | Watanabe |
| 2013/0343393 A1 | 12/2013 | Sugihara |
| 2014/0040459 A1 | 2/2014 | Agrawal et al. |
| 2014/0286342 A1 | 9/2014 | Xia et al. |
| 2015/0009828 A1 | 1/2015 | Murakami |
| 2015/0043586 A1 | 2/2015 | Oonuki |
| 2016/0087873 A1 | 3/2016 | Wang |
| 2016/0234097 A1 | 8/2016 | Chang |
| 2016/0330167 A1 | 11/2016 | Cai et al. |

FOREIGN PATENT DOCUMENTS

| | | | |
|---|---|---|---|
| CN | 103401784 A | | 11/2013 |
| CN | 103401794 A | | 11/2013 |
| CN | 103428094 A | | 12/2013 |
| CN | 103491095 A | | 1/2014 |
| CN | 103607348 A | | 2/2014 |
| CN | 103685033 A | | 3/2014 |
| CN | 104052685 A | | 9/2014 |
| CN | 104158747 A | | 11/2014 |
| EP | 2869509 A1 | | 5/2015 |
| WO | 2013133227 A1 | | 9/2013 |
| WO | 2014019205 A1 | | 2/2014 |

OTHER PUBLICATIONS

Machine Translation and Abstract of Chinese Publication No. CN103401794, Nov. 20, 2013, 8 pages.
Machine Translation and Abstract of Chinese Publication No. CN103491095, Jan. 1, 2014, 15 pages.
Machine Translation and Abstract of Chinese Publication No. CN103607348, Feb. 26, 2014, 21 pages.
Machine Translation and Abstract of Chinese Publication No. CN103685033, Mar. 26, 2014, 12 pages.
Machine Translation and Abstract of Chinese Publication No. CN104052685, Sep. 17, 2014, 42 pages.
"OpenFlow Notifications Framework, OpenFlow Management," ONF TS-014, Version 1.0, Oct. 15, 2013, 18 pages.
"OpenFlow Switch Specification," ONF TS-002, Version 1.1.0 Implemented, (Wire Protocol 0x02), Feb. 28, 2011, 58 pages.
"OpenFlow Switch Specification," ONF TS-003, Version 1.2, (Wire Protocol 0x03), Dec. 5, 2011, 85 pages.
"OpenFlow Switch Specification," ONF TS-006, Version 1.3.0, (Wire Protocol 0x04), Jun. 25, 2012, 106 pages.
"OpenFlow Switch Specification," Version 1.3.4 ( Protocol version 0x04 ), Mar. 27, 2014, 171 pages.
Phan, X., et al., "A collaborative model for routing in multi-domains OpenFlow networks," XP32345867, International Conference on Computing, Management and Telecommunications, Jan. 21, 2013, pp. 278-283.
Foreign Communication From a Counterpart Application, Chinese Application No. 2014800367678, Chinese Search Report dated Mar. 22, 2018, 2 pages.
Foreign Communication From a Counterpart Application, Chinese Application No. 201480036767.8, Chinese Office Action dated Apr. 3, 2018, 4 pages.
Foreign Communication From a Counterpart Application, European Application No. 14899203.5, Extended European Search Report dated Jul. 17, 2017, 8 pages.
Foreign Communication From a Counterpart Application, PCT Application No. PCT/CN2014/083804, International Search Report dated Oct. 15, 2014, 7 pages.
Foreign Communication From a Counterpart Application, PCT Application No. PCT/CN2014/083804, International Search Report dated Apr. 27, 2015, 4 pages.
Foreign Communication From a Counterpart Application, PCT Application No. PCT/CN2014/094128, English Translation of International Search Report dated May 11, 2015, 2 pages.
Foreign Communication From a Counterpart Application, PCT Application No. PCT/CN2014/094128, English Translation of Written Opinion dated May 11, 2015, 6 pages.

DATA PACKET PROCESSING METHOD, APPARATUS, AND SYSTEM IN SOFTWARE DEFINED NETWORK SDN

CROSS-REFERENCE TO RELATED APPLICATIONS

This application is a continuation of U.S. patent application Ser. No. 15/425,663 filed on Feb. 6, 2017, which is a continuation of International Patent Application No. PCT/CN2014/094128 filed on Dec. 17, 2014. The International Patent Application claims priority to International Patent Application No. PCT/CN2014/083804 filed on Aug. 6, 2014. All of the aforementioned patent applications are hereby incorporated by reference in their entireties.

TECHNICAL FIELD

Embodiments of the present disclosure relate to the communications service field, and further, to a data packet processing method, an apparatus, and a system in a software defined network (SDN).

BACKGROUND

In an SDN, separation of a data control layer from a data forwarding layer is implemented. A control device has a control function of the control layer, and a switching device has a forwarding function of the forwarding layer. The switching device may be connected to multiple control devices. Generally, two working modes exist between the control device and the switching device, an equal mode and a master/slave mode.

In the equal mode, multiple control devices on an equal footing have same control permission for one switching device, and the control devices are independent of each other. A control device A may deliver a flow entry to the switching device, and a control device B may also deliver a flow entry to the switching device.

The switching device receives a data packet, and searches a flow table for a flow entry including a match field that matches the data packet. If the found flow entry instructs the switching device to send the data packet to the control device, in the equal mode, the switching device needs to send the data packet to both the control device A and the control device B.

In some approaches, there are two processing solutions for the control device A and the control device B after the data packet is received. Solution 1: The control device A and the control device B generate a flow entry respectively, and deliver the flow entries to the switching device. Solution 2: The control device A negotiates with the control device B to determine that one of the two control devices processes the data packet and delivers a flow entry.

Regardless of either processing solution, a waste of control device resources and extra bandwidth consumption of a control channel may be caused, and consequently the control device may become a bottleneck of a network.

SUMMARY

An objective of embodiments of the present disclosure is to provide a data packet processing method, an apparatus, and a system in an SDN, which can implement classification of a new flow at a forwarding layer, reduce processing pressure of a controller, and improve overall performance of a network.

According to a first aspect, a method for processing a data packet by a switching device in an SDN is provided, including establishing, by the switching device, a first control channel with a first control device, and establishing, by the switching device, a second control channel with a second control device, receiving, by the switching device, a first flow entry and a second flow entry, where the first flow entry includes a first match field and an identifier of the first control channel, and the first flow entry is used to instruct the switching device to send, to the first control device using the first control channel represented by the identifier of the first control channel, a data packet that matches the first match field. The second flow entry includes a second match field and an identifier of the second control channel, and the second flow entry is used to instruct the switching device to send, to the second control device using the second control channel represented by the identifier of the second control channel, a data packet that matches the second match field, and the identifier of the first control channel is different from the identifier of the second control channel, and the first match field is different from the second match field, receiving, by the switching device, a first data packet, sending, by the switching device, the first data packet to the first control device using the first control channel represented by the identifier of the first control channel if the switching device determines that the first data packet matches the first match field, receiving, by the switching device, a second data packet, and sending, by the switching device, the second data packet to the second control device using the second control channel represented by the identifier of the second control channel if the switching device determines that the second data packet matches the second match field.

With reference to the first aspect, in a first possible implementation manner of the first aspect, before receiving, by the switching device, a first flow entry and a second flow entry, the method further includes receiving, by the switching device, a request message sent by the first control device, where the request message is used to query the identifier of the first control channel, sending, by the switching device, the identifier of the first control channel to the first control device in response to the request message sent by the first control device, receiving, by the switching device, a request message sent by the second control device, where the request message sent by the second control device is used to query the identifier of the second control channel, and sending, by the switching device, the identifier of the second control channel to the second control device in response to the request message sent by the second control device.

With reference to the first possible implementation manner of the first aspect, in a second possible implementation manner of the first aspect, the switching device receives, using the first control channel, the request message sent by the first control device, the switching device sends the identifier of the first control channel to the first control device using the first control channel. The switching device receives, using the second control channel, the request message sent by the second control device, and the switching device sends the identifier of the second control channel to the second control device using the second control channel.

With reference to any one of the first aspect, or the first to the second possible implementation manners of the first aspect, in a third possible implementation manner of the first aspect, priorities of the first flow entry and the second flow entry are the lowest among priorities of flow entries in a flow table stored by the switching device.

With reference to any one of the first aspect, or the first to the third possible implementation manners of the first aspect, in a fourth possible implementation manner of the first aspect, the method further includes establishing, by the switching device, a third control channel with a third control device, where the first flow entry further includes an identifier of the third control channel, the first flow entry is further used to instruct the switching device to send, to the third control device using the third control channel represented by the identifier of the third control channel, the data packet that matches the first match field, and the identifier of the third control channel is different from both the identifier of the first control channel and the identifier of the second control channel.

With reference to any one of the first aspect, or the first to the fourth possible implementation manners of the first aspect, in a fifth possible implementation manner of the first aspect, both the identifier of the first control channel and the identifier of the second control channel are logical port numbers of the switching device, or both the identifier of the first control channel and the identifier of the second control channel are physical port numbers of the switching device, or the identifier of the first control channel is an identifier of a network connection between the switching device and the first control device, and the identifier of the second control channel is an identifier of a network connection between the switching device and the second control device.

According to a second aspect, a switching device in an SDN is provided, including a protocol processing unit configured to establish a first control channel with a first control device, and establish a second control channel with a second control device, a receiving unit configured to receive a first flow entry and a second flow entry, where the first flow entry includes a first match field and an identifier of the first control channel, and the first flow entry is used to instruct the switching device to send, to the first control device using the first control channel represented by the identifier of the first control channel, a data packet that matches the first match field. The second flow entry includes a second match field and an identifier of the second control channel, and the second flow entry is used to instruct the switching device to send, to the second control device using the second control channel represented by the identifier of the second control channel, a data packet that matches the second match field, and the identifier of the first control channel is different from the identifier of the second control channel, and the first match field is different from the second match field, a storage unit configured to store the first flow entry and the second flow entry, where the receiving unit is further configured to receive a first data packet and a second data packet, a data packet processing unit configured to determine that the first data packet matches the first match field, and determine that the second data packet matches the second match field, and a sending unit configured to send the first data packet to the first control device using the first control channel represented by the identifier of the first control channel, and send the second data packet to the second control device using the second control channel represented by the identifier of the second control channel.

With reference to the second aspect, in a first possible implementation manner of the second aspect, the receiving unit is further configured to receive a request message sent by the first control device, where the request message is used to query the identifier of the first control channel, and receive a request message sent by the second control device, where the request message sent by the second control device is used to query the identifier of the second control channel, and the sending unit is further configured to send the identifier of the first control channel to the first control device in response to the request message sent by the first control device, and send the identifier of the second control channel to the second control device in response to the request message sent by the second control device.

With reference to the second aspect or the first possible implementation manner of the second aspect, in a second possible implementation manner of the second aspect, priorities of the first flow entry and the second flow entry are the lowest among priorities of flow entries in a flow table stored by the switching device.

With reference to any one of the second aspect, or the first to the second possible implementation manners of the second aspect, in a third possible implementation manner of the second aspect, the protocol processing unit is further configured to establish a third control channel with a third control device, and the first flow entry further includes an identifier of the third control channel, the first flow entry is further used to instruct the switching device to send, to the third control device using the third control channel represented by the identifier of the third control channel, the data packet that matches the first match field, and the identifier of the third control channel is different from both the identifier of the first control channel and the identifier of the second control channel.

With reference to any one of the second aspect, or the first to the third possible implementation manners of the second aspect, in a fourth possible implementation manner of the second aspect, both the identifier of the first control channel and the identifier of the second control channel are logical port numbers of the switching device, or both the identifier of the first control channel and the identifier of the second control channel are physical port numbers of the switching device, or the identifier of the first control channel is an identifier of a network connection between the switching device and the first control device, and the identifier of the second control channel is an identifier of a network connection between the switching device and the second control device.

According to a third aspect, a method executed by a control device in an SDN is provided, including establishing, by the control device, a control channel with a switching device, obtaining, by the control device, an identifier of the control channel, generating, by the control device, a flow entry, where the flow entry includes a match field and the identifier of the control channel, and sending, by the control device, the flow entry to the switching device, where the flow entry is used to instruct the switching device to send, to the control device using the control channel represented by the identifier of the control channel, a data packet that matches the match field.

With reference to the third aspect, in a first possible implementation manner of the third aspect, obtaining, by the control device, an identifier of the control channel includes sending, by the control device, a request message to the switching device, where the request message is used to query the identifier of the control channel, and receiving, by the control device, a response message sent by the switching device, where the response message carries the identifier of the control channel.

With reference to the first possible implementation manner of the third aspect, in a second possible implementation manner of the third aspect, the control device sends the request message to the switching device using the control channel.

With reference to any one of the third aspect, or the first to the second possible implementation manners of the third aspect, in a third possible implementation manner of the third aspect, a priority of the flow entry is the lowest among priorities of flow entries in a flow table stored by the switching device.

With reference to any one of the third aspect, or the first to the third possible implementation manners of the third aspect, in a fourth possible implementation manner of the third aspect, the identifier of the control channel is a logical port number of the switching device, or the identifier of the control channel is a physical port number of the switching device, or the identifier of the t control channel is an identifier of a network connection between the switching device and the control device.

According to a fourth aspect, a control device in an SDN is provided, including a protocol processing unit configured to establish a control channel with a switching device, a management unit configured to obtain an identifier of the control channel, a flow entry generation unit configured to generate a flow entry, where the flow entry includes a match field and the identifier of the control channel, and a sending unit configured to send the flow entry to the switching device, where the flow entry is used to instruct the switching device to send, to the control device using the control channel represented by the identifier of the control channel, a data packet that matches the match field.

With reference to the fourth aspect, in a first possible implementation manner of the fourth aspect, the sending unit is further configured to send a request message to the switching device, where the request message is used to query the identifier of the control channel, and the management unit is further configured to receive a response message sent by the switching device, where the response message carries the identifier of the control channel.

According to a fifth aspect, an SDN system is provided, including a first control device, a second control device, and a switching device, where the first control device is configured to establish a first control channel with the switching device. The second control device is configured to establish a second control channel with the switching device. The switching device is configured to receive a first flow entry and a second flow entry, where the first flow entry includes a first match field and an identifier of the first control channel, and the first flow entry is used to instruct the switching device to send, to the first control device using the first control channel represented by the identifier of the first control channel, a data packet that matches the first match field. The second flow entry includes a second match field and an identifier of the second control channel, and the second flow entry is used to instruct the switching device to send, to the second control device using the second control channel represented by the identifier of the second control channel, a data packet that matches the second match field, and the identifier of the first control channel is different from the identifier of the second control channel, and the first match field is different from the second match field, and the switching device is further configured to store the first flow entry and the second flow entry, receive a first data packet, determine that the first data packet matches the first match field, send the first data packet to the first control device using the first control channel represented by the identifier of the first control channel, receive a second data packet, determine that the second data packet matches the second match field, and send the second data packet to the second control device using the second control channel represented by the identifier of the second control channel.

With reference to the fifth aspect, in a first possible implementation manner of the fifth aspect, the first control device is further configured to obtain the identifier of the first control channel, generate the first flow entry, and send the first flow entry to the switching device, and the second control device is further configured to obtain the identifier of the second control channel, generate the second flow entry, and send the second flow entry to the switching device.

With reference to the fifth aspect or the first possible implementation manner of the fifth aspect, in a second possible implementation manner of the fifth aspect, the system further includes a third control device configured to establish a third control channel with the switching device, where the first flow entry further includes an identifier of the third control channel, the first flow entry is further used to instruct the switching device to send, to the third control device using the third control channel represented by the identifier of the third control channel, the data packet that matches the first match field, and the identifier of the third control channel is different from both the identifier of the first control channel and the identifier of the second control channel.

Beneficial effects of the embodiments of the present disclosure are as follows. A control device cooperates with a switching device, and the control device delivers a classification rule of a new flow to the switching device in a form of a flow entry, and transfers centralized classification processing work for the new flow that is previously implemented by the control device to the switching device in order to be implemented in a distributed manner such that the switching device can effectively share processing pressure of the control device, thereby improving overall flow processing effectiveness of a network.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure.

DESCRIPTION OF EMBODIMENTS

Figure 1:
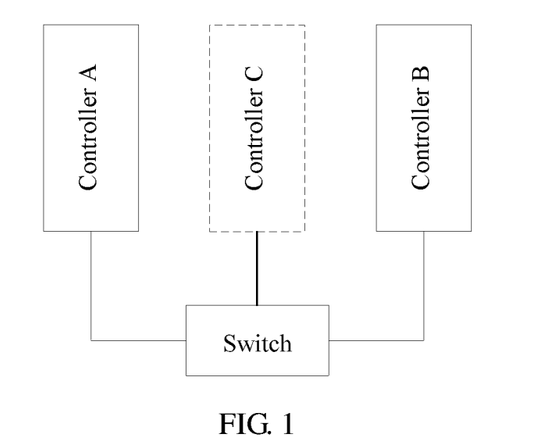
FIG. 1 is a schematic diagram of an architecture of an SDN system according to an embodiment of the present disclosure.

As shown in FIG. 1, an SDN system in an embodiment of the present disclosure includes a switch, a controller A, and a controller B, and may further include a controller C. The switch is connected to each of the controller A, the controller B, and the controller C using an OPENFLOW control channel.

Figure 2:
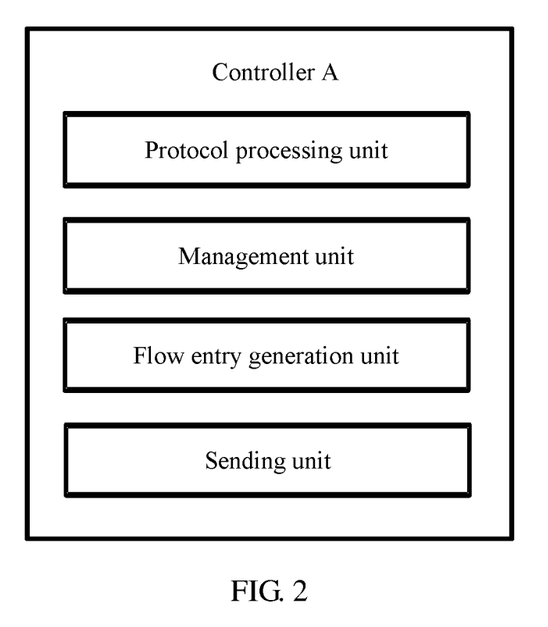
FIG. 2 is a schematic diagram of composition of a controller according to an embodiment of the present disclosure.

A structure of the controller A is similar to that of the controller B and controller C. Herein, the controller A is used as an example to describe a structure of a controller. Referring to FIG. 2, the controller A includes a protocol processing unit, a management unit, a flow entry generation unit, and a sending unit. The protocol processing unit is configured to establish a control channel with a switch. The management unit is configured to obtain an identifier of the control channel. The flow entry generation unit is configured to generate a flow entry, where the flow entry includes a match field and the identifier of the control channel. The sending unit is configured to send the flow entry to the switch, where the flow entry is used to instruct the switch to send, to the controller using the control channel represented by the identifier of the control channel, a data packet that matches the match field. The sending unit is further configured to send a request message to the switch, where the request message is used to query the identifier of the control channel. The management unit is further configured to receive a response message sent by the switch, where the response message carries the identifier of the control channel.

A classification flow table includes several flow entries. A flow entry reflects a classification rule for a new flow so that the switch completes classification of the new flow according to the classification rule for the new flow. The new flow refers to a to-be-forwarded flow that cannot match a normal flow entry which already exists in the switch and which is used for forwarding. A specific classification rule may be shown in Table 1.

TABLE 1

Classification rule

| | | | Features of different classifications | |
| --- | --- | --- | --- | --- |
| Field | Premise | Description | IP version 4 (IPv4) Layer 2 (L2) | IPv4 Layer 3 (L3) |
| Ethernet packet type (ETH_Type) | None | Distinguish: Link Layer Discovery Protocol (LLDP), Address Resolution Protocol (ARP), Internet Protocol (IP), virtual local area network (VLAN), QinQ, Multiprotocol Label Switching (MPLS) | 0x0800 | 0x0800 |
| Destination media access control (MAC) address (ETH_DST) | None | Distinguish: multicast, broadcast, unicast | * | Gateway MAC: xx-xx-xx-xx-xx-xx |
| IP type (IP_PROTO) | ETH_Type = 0x0800 ETH_Type = 0x86dd | Distinguish: IP protocol type | * | * |
| Source IP address (IP_SRC) | ETH_Type = 0x0800 ETH_Type = 0x86dd | Cooperate with IP_Dst to distinguish: L2 forwarding, L3 forwarding, and multicast forwarding | 192.168.0.0 Bitmask: 0xffff0000 | * |
| Destination IP address (IP_DST) | ETH_Type = 0x0800 ETH_Type = 0x86dd | Cooperate with IP_Src to distinguish: L2 forwarding, L3 forwarding, and multicast forwarding | 192.168.0.0 Bitmask: 0xffff0000 | * |
| Destination Transmission Control Protocol (TCP) port number (TCP_DST) | IP_PROTO = 6 | Distinguish: special purpose application, such as a DNS | * | * |
| Destination User Datagram Protocol (UDP) port number (UDP_DST) | IP_PROTO = 17 | | * | * |

Note:
* represents a wildcard, that is, no requirement.

The classification rule may be defined at a stage of network planning, and formulated according to factors such as performance of a controller and a distance between a controller and a switch. The classification rule includes some features that are used for flow classification. These features are further a match field corresponding to a flow and a match value corresponding to the match field, and therefore, flow entries that include these match fields form a classification flow entry.

As shown in Table 1, several match fields such as ETH_Type, ETH_DST, IP_PROTO, IP_SRC, IP_DST, TCP_DST, and UDP_DST, or another match field that can be used by a person skilled in the art may be selected, which is not enumerated herein exhaustively.

L2 forwarding and L3 forwarding of an IPv4 data packet are used as an example. The controller generates a classification flow entry for the new flow (where OPENFLOW 1.0 is used as an example) according to the classification rule for the new flow in Table 1. The classification flow entry may be shown in Table 2.

and the controller B are determined according to specific capabilities of the controllers and/or different system requirements. Classification flow entries for a new flow that are delivered by the controllers with different functional roles to a switch are different. For example, the controller A is responsible for L2 forwarding, and the controller B is responsible for L3 forwarding, or the controller A is responsible for IPv4 data packet forwarding, and the controller B is responsible for IP version 6 (IPv6) data packet forwarding.

A method for configuring a functional role of a controller is implemented in the following processes. (1) In a centralized management manner, an independent centralized management and configuration server completes allocation of functional roles of all controllers. (2) In a manual configuration manner, functional roles of all controllers are configured manually. Certainly, a person of ordinary skill in the art may further use, according to a specific case, a method of combining the centralized management manner with the manual configuration manner. Details are not described herein.

TABLE 2

| | | Match field | | | | | Priority | Action |
|---|---|---|---|---|---|---|---|---|
| ETH_Type | ETH_DST | IP_PROTO | IP_SRC | IP_DST | TCP_DST | UDP_DST | Priority | Action |
| IPv4 L2 | 0x0800 | * | * | 192.168.0.0 Bitmask: 0xffff0000 | 192.168.0.0 Bitmask: 0xffff0000 | * | * | 0 | Output controller_id01 |
| IPv4 L3 | 0x0800 | Gateway MAC: xx-xx-xx-xx-xx-xx | * | * | * | * | * | 0 | Output controller_id02 |

Figure 3:
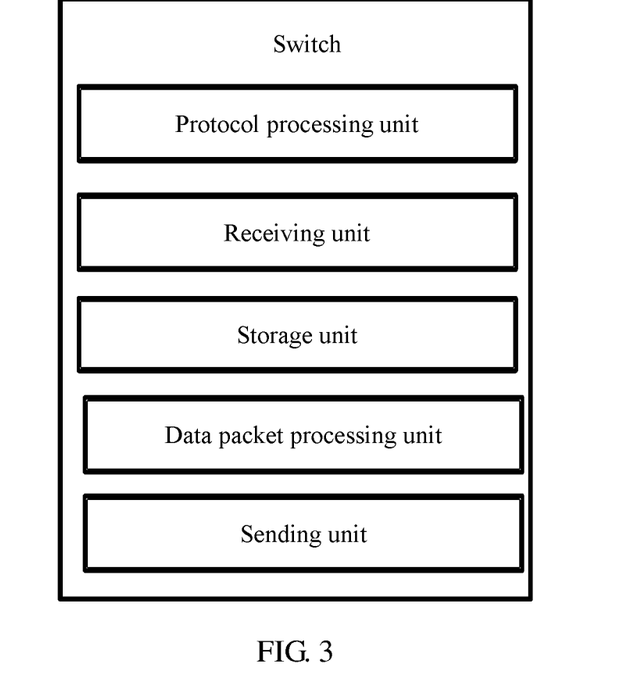
FIG. 3 is a schematic diagram of composition of a switch according to an embodiment of the present disclosure.

As shown in FIG. 3, a switch in an embodiment of the present disclosure includes a protocol processing unit, a receiving unit, a storage unit, a data packet processing unit, and a sending unit. The protocol processing unit is configured to establish a first control channel with a controller A, and establish a second control channel with a controller B. The receiving unit is configured to receive a first flow entry and a second flow entry, and is further configured to receive a request message sent by the controller A, where the request message is used to query an identifier of the first control channel, and receive a request message sent by the controller B, where the request message sent by the controller B is used to query an identifier of the second control channel. The storage unit is configured to store the first flow entry and the second flow entry. The data packet processing unit is configured to determine that a first data packet matches a first match field, and determine that a second data packet matches a second match field. The sending unit is configured to send the first data packet to the controller A using the first control channel represented by the identifier of the first control channel, and send the second data packet to the controller B using the second control channel represented by the identifier of the second control channel. The sending unit is further configured to send the identifier of the first control channel to the controller A in response to the request message sent by the controller A, and send the identifier of the second control channel to the controller B in response to the request message sent by the controller B.

The matching refers to matching feature information in a data packet with a match value in a flow entry.

Figure 4A:
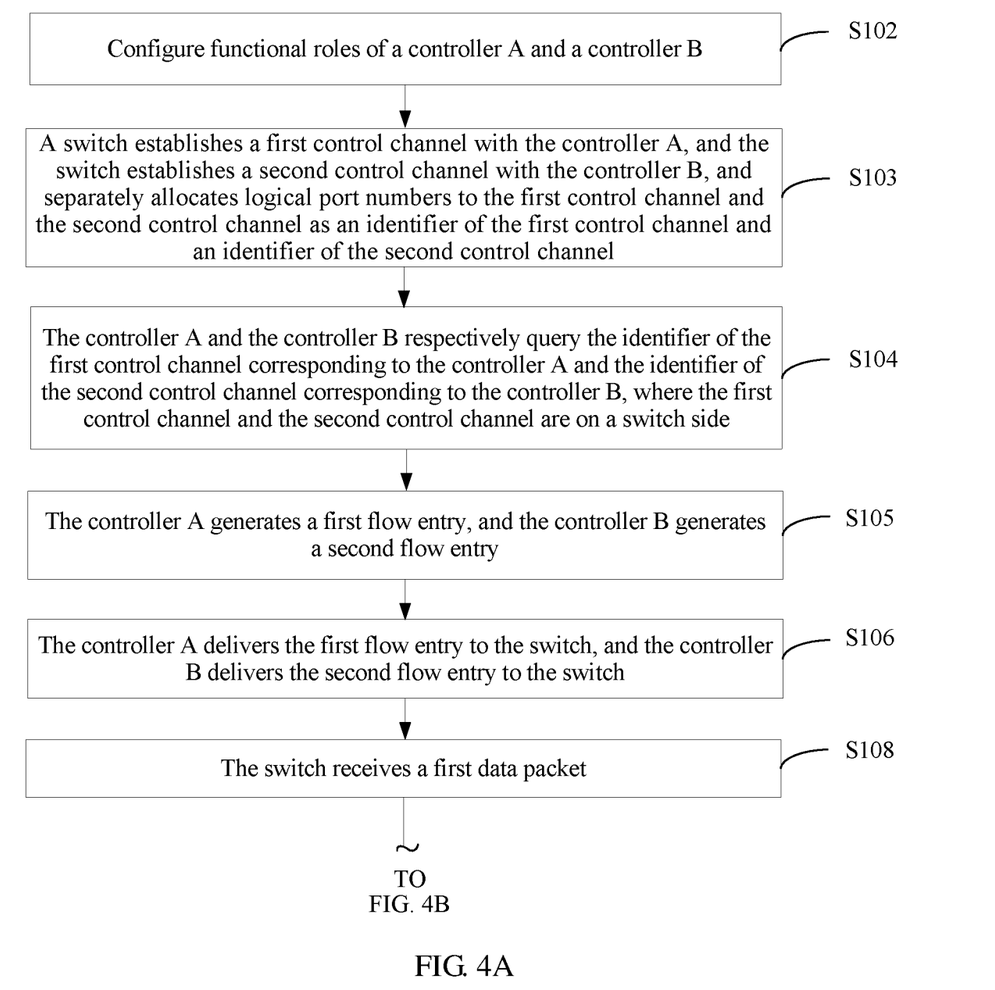
FIG. 4A and FIG. 4B are a flowchart of a method according to an embodiment of the present disclosure.
Figure 4B:
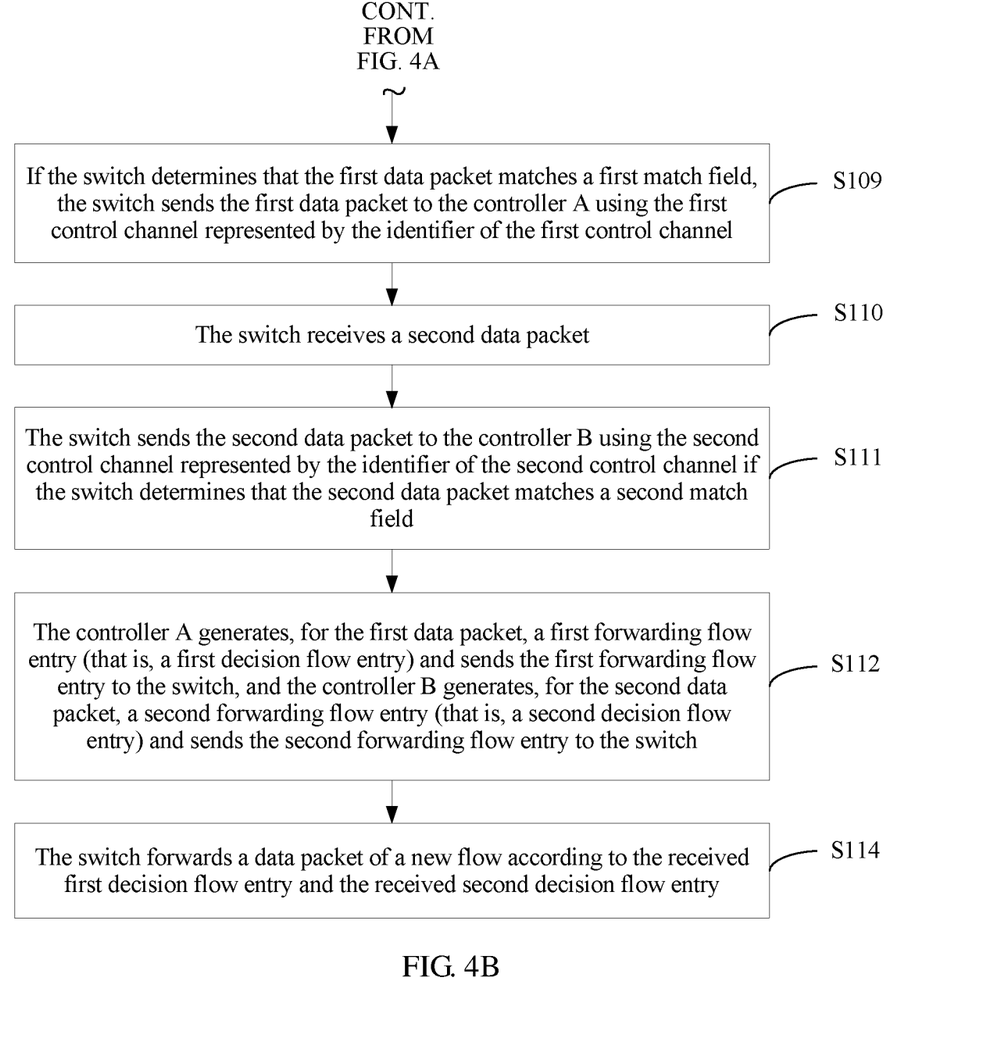

As shown in FIG. 4A and FIG. 4B, a data packet processing method in an SDN according to an embodiment of the present disclosure includes the following steps.

Step S102: Configure functional roles of a controller A and a controller B. The functional roles of the controller A Step S103: A switch establishes a first control channel with the controller A, and the switch establishes a second control channel with the controller B, and separately allocates logical port numbers to the first control channel and the second control channel as an identifier of the first control channel and an identifier of the second control channel. A logical port number is locally unique on a switch side, and one logical port number represents a control channel established by a switch with a controller, or one logical port number represents a corresponding controller on the switch side. In addition, local means that a port number is unique on the switch side, but on a controller side, port numbers allocated to the controller by different switches may be the same (not unique).

Step S104: The controller A and the controller B respectively query the identifier of the first control channel corresponding to the controller A and the identifier of the second control channel corresponding to the controller B, where the first control channel and the second control channel are on a switch side. The step S104 further includes the following steps.

Step S104a: The switch receives, using the first control channel, a request message sent by the controller A, where the request message is used to query the identifier of the first control channel.

Step S104b: The switch sends, in response to the request message sent by the controller A, the identifier of the first control channel to the controller A using the first control channel.

Step S104c: The switch receives, using the second control channel, a request message sent by the controller B, where the request message sent by the controller B is used to query the identifier of the second control channel.

Step S104d: The switch sends, in response to the request message sent by the controller B, the identifier of the second control channel to the controller B using the second control channel.

In this embodiment, the identifier of the first control channel and the identifier of the second control channel are logical port numbers of the switch. Certainly, alternatively, the identifier of the first control channel and the identifier of the second control channel may be physical port numbers of the switch, or identifiers of network connections between the switch and the controller A and between the switch and the controller B.

A specific example of a manner of obtaining a logical port number is as follows. The existing OPENFLOW 1.0 protocol and OPENFLOW 1.1 and above separately specify a logical port OFPP_CONTROLLER, but define only one value, where the value represents control channels between all controllers and a switch. In this embodiment of the present disclosure, in order that a new flow is reported to different controllers, a protocol needs to be extended, to make each control channel between the controllers and the switch correspond to a unique logical port number in a one-to-one manner, for example, correspond to any identifier number in a range from 0x(ffff)ff01 to 0x(ffff)fff7.

In addition, an OPENFLOW protocol further needs to be extended in order to support a controller in querying, using a control channel, a logical port number corresponding to the control channel.

A query command of the controller may be constructed as follows:

```
struct ofp_multipart_request {
    struct ofp_header header;
    uint16_t    type;       /* OFPMP_CONTROLLER_PORT_NUM = xx */
    uint16_t    flags;
    uint8_t     pad[4];
    uint8_t     body[0];    /* Body of the request*/
};
```

A response of the switch to the query command may be constructed as follows:

```
struct ofp_multipart_reply {
    struct ofp_header header;
    uint16_t    type;       /* OFPMP_CONTROLLER_PORT_NUM = xx */
    uint16_t    flags;
    uint8_t     pad[4];
    uint32_t    port_id;    /* Body of the request*/
};
``` where, port_id is the logical port number corresponding to the control channel.

Step S105: The controller A generates a first flow entry, and the controller B generates a second flow entry, where the first flow entry includes a first match field and the identifier of the first control channel, and the first flow entry is used to instruct the switch to send, to the controller A using the first control channel represented by the identifier of the first control channel, a data packet that matches the first match field. The second flow entry includes a second match field and the identifier of the second control channel, and the second flow entry is used to instruct the switch to send, to the controller B using the second control channel represented by the identifier of the second control channel, a data packet that matches the second match field, and the identifier of the first control channel is different from the identifier of the second control channel, and the first match field is different from the second match field.

Step S106: The controller A delivers the first flow entry to the switch, and the controller B delivers the second flow entry to the switch.

Optionally, a controller C delivers the first flow entry and the second flow entry to the switch. Further, the controller C interacts with the controller A, obtains the identifier of the first control channel, and generates the first flow entry. The controller C interacts with the controller B, obtains the identifier of the second control channel, and generates the second flow entry, and the controller C delivers the first flow entry and the second flow entry to the switch.

Optionally, a controller C delivers the first flow entry and the second flow entry to the switch. Further, the controller C interacts with the switch using a third control channel, obtains the identifier of the first control channel and the identifier of the second control channel, and generates the first flow entry and the second flow entry. Then the controller C delivers the first flow entry and the second flow entry to the switch.

The first flow entry and the second flow entry may be further shown in Table 2. A priority "0" of a flow entry indicates a lowest priority, that is, priorities of the first flow entry and the second flow entry are the lowest among priorities of flow entries in a flow table stored by the switch. The first flow entry and the second flow entry may be matched at last. Therefore, normal matching for the other higher-priority flow entries is not affected, and a purpose of classifying a new flow is achieved.

Step S108: The switch receives a first data packet.

Step S109: If the switch determines that the first data packet matches the first match field, the switch sends the first data packet to the controller A using the first control channel represented by the identifier of the first control channel.

In step S109, the switch determines that the first data packet matches the first match field. Because the second match field is different from the first match field, and generally, the first data packet does not match the second match field, the switch does not send the first data packet to the controller B using the second control channel represented by the identifier of the second control channel.

Step S110: The switch receives a second data packet.

Step S111: The switch sends the second data packet to the controller B using the second control channel represented by the identifier of the second control channel if the switch determines that the second data packet matches the second match field.

Based on the same reason, the switch does not send the second data packet to the controller A.

Step S112: The controller A generates, for the first data packet, a first forwarding flow entry (that is, a first decision flow entry) and sends the first forwarding flow entry to the switch, and the controller B generates, for the second data packet, a second forwarding flow entry (that is, a second decision flow entry) and sends the second forwarding flow entry to the switch.

Step S114: The switch forwards a data packet of a new flow according to the received first decision flow entry and the received second decision flow entry.

Figure 5A:
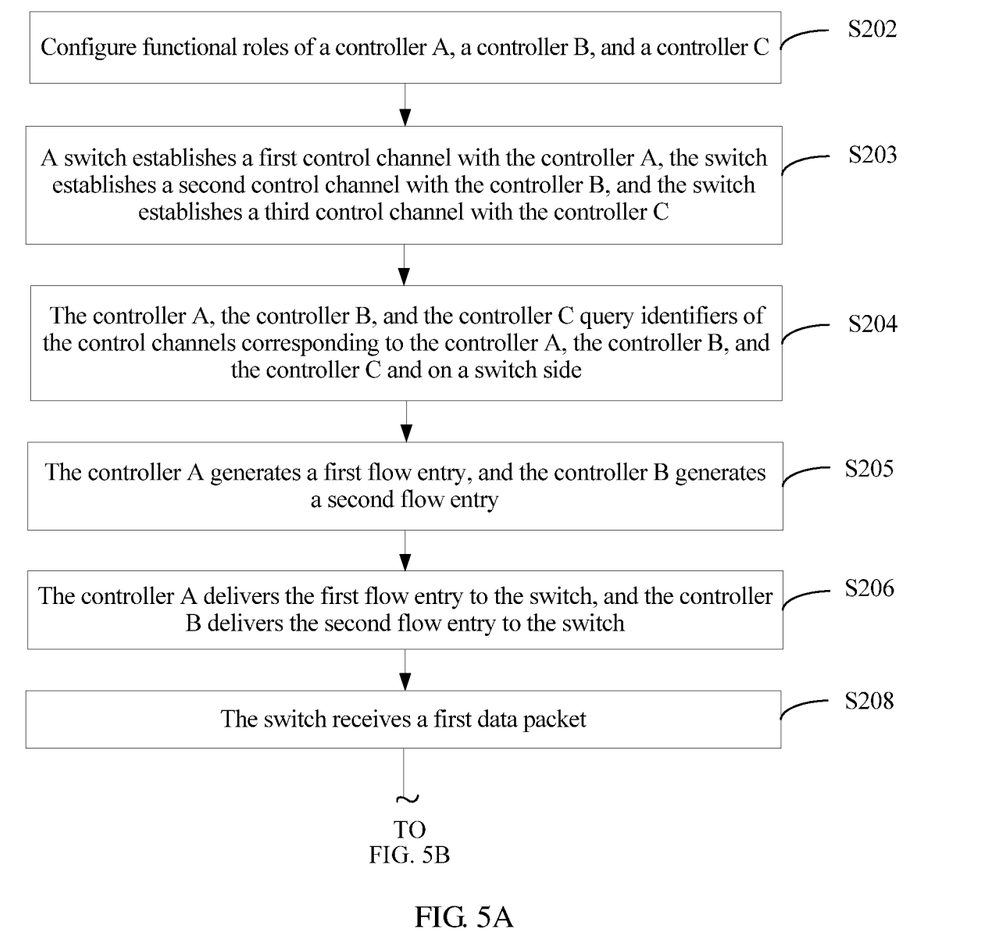
FIG. 5A and FIG. 5B are a flowchart of a method according to another embodiment of the present disclosure.
Figure 5B:
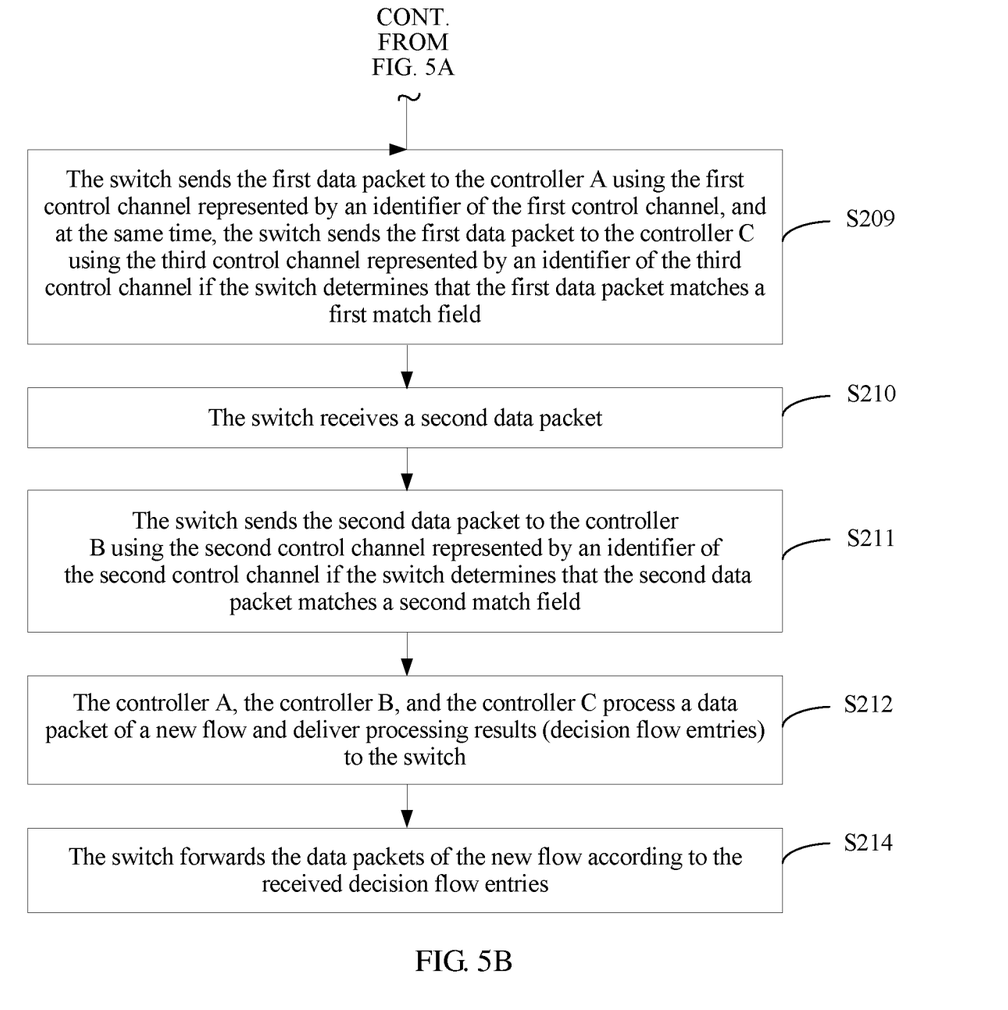

As shown in FIG. 5A and FIG. 5B, a data packet processing method in an SDN network according to another embodiment of the present disclosure includes the following steps.

Step S202: Configure functional roles of a controller A, a controller B, and a controller C. The functional roles of the controller A, the controller B, and the controller C are determined according to specific capabilities of the controllers and/or different system requirements. Classification flow entries for a new flow that are delivered by the controllers with different functional roles to a switch are different. For example, the controller A is responsible for L2 forwarding, and the controller B is responsible for L3 forwarding, or the controller A is responsible for IPv4 data packet forwarding, and the controller B is responsible for IPv6 data packet forwarding.

A method for configuring a functional role of a controller is further implemented in the following processes. (1) In a centralized management manner, an independent centralized management and configuration server completes allocation of functional roles of all controllers. (2) In a manual configuration manner, functional roles of all controllers are configured manually. Certainly, a person of ordinary skill in the art may further use, according to a specific case, a method of combining the centralized management manner with the manual configuration manner. Details are not described herein.

Step S203: A switch establishes a first control channel with the controller A, the switch establishes a second control channel with the controller B, and the switch establishes a third control channel with the controller C.

Step S204: The controller A, the controller B, and the controller C query identifiers of the control channels corresponding to the controller A, the controller B, and the controller C and on a switch side.

Step S205: The controller A generates a first flow entry, and the controller B generates a second flow entry, where the first flow entry includes a first match field and an identifier of the first control channel, and the first flow entry is used to instruct the switch to send, to the controller A using the first control channel represented by the identifier of the first control channel, a data packet that matches the first match field. The second flow entry includes a second match field and an identifier of the second control channel, and the second flow entry is used to instruct the switch to send, to the controller B using the second control channel represented by the identifier of the second control channel, a data packet that matches the second match field.

The first flow entry further includes an identifier of the third control channel, the first flow entry is further used to instruct the switch to send, to the controller C using the third control channel represented by the identifier of the third control channel, the data packet that matches the first match field, and the identifier of the third control channel is different from both the identifier of the first control channel and the identifier of the second control channel.

Step S206: The controller A delivers the first flow entry to the switch, and the controller B delivers the second flow entry to the switch.

Step S208: The switch receives a first data packet.

Step S209: The switch sends the first data packet to the controller A using the first control channel represented by the identifier of the first control channel, and at the same time, the switch sends the first data packet to the controller C using the third control channel represented by the identifier of the third control channel if the switch determines that the first data packet matches the first match field.

Step S210: The switch receives a second data packet.

Step S211: The switch sends the second data packet to the controller B using the second control channel represented by the identifier of the second control channel if the switch determines that the second data packet matches the second match field.

Step S212: The controller A, the controller B, and the controller C process a data packet of a new flow and deliver processing results (decision flow entries) to the switch.

Step S214: The switch forwards the data packet of the new flow according to the received decision flow entries.

In this embodiment of the present disclosure, a controller cooperates with a switch, and the controller delivers, in a form of a flow entry, a classification rule for a new flow, and transfers centralized classification processing work for the new flow that is previously implemented by the controller to the switch in order to be implemented in a distributed manner, which can effectively share processing pressure of the controller, and improve overall flow processing effectiveness of a network.

Figure 6:
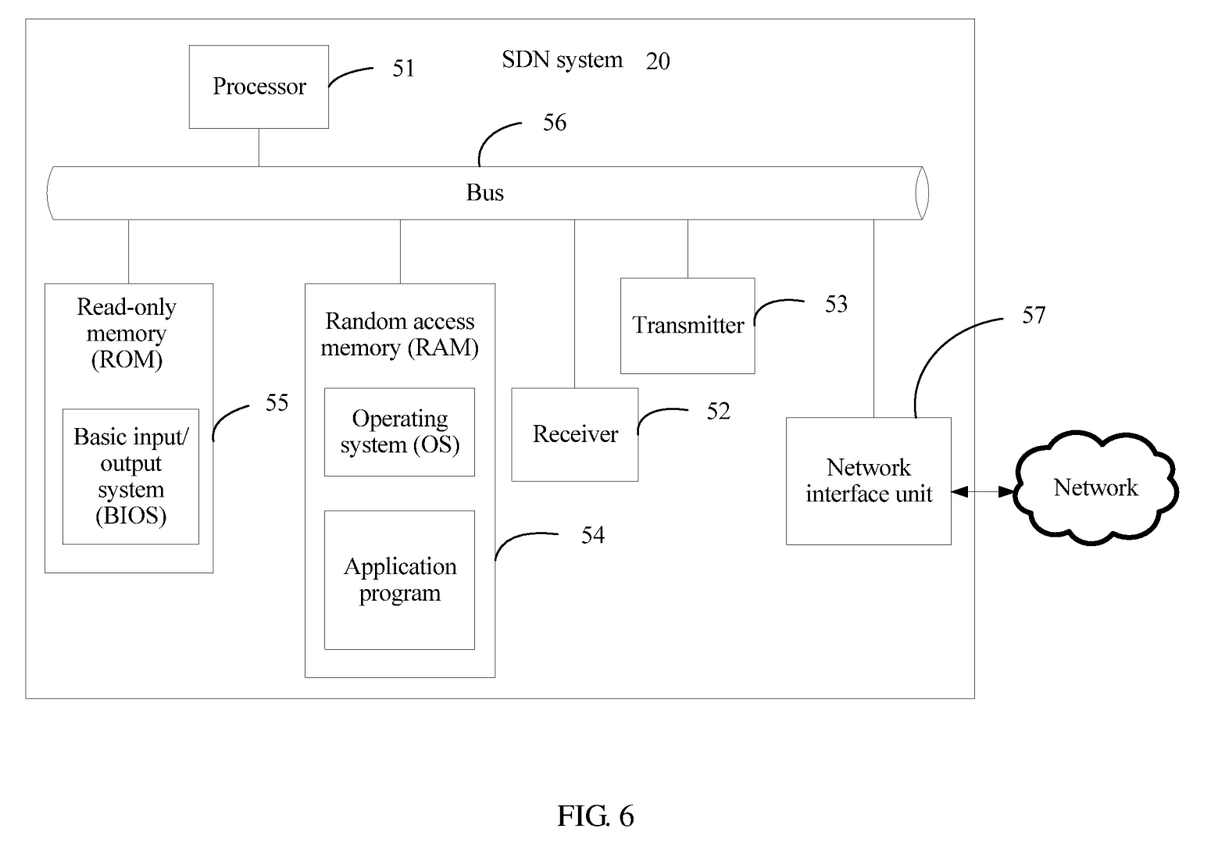
FIG. 6 is a schematic structural diagram of an SDN system according to an embodiment of the present disclosure.

Referring to FIG. 6, FIG. 6 is a schematic structural diagram of an SDN system according to an embodiment of the present disclosure. An SDN system 20 includes a processor 51, a receiver 52, a transmitter 53, a random access memory (RAM) 54, a read-only memory (ROM) 55, a bus 56, and a network interface unit 57. The processor 51 is coupled to each of the receiver 52, the transmitter 53, the RAM 54, the ROM 55, and the network interface unit 57 using the bus 56. When it is required to run a data packet processing system in an SDN, a basic input/output system (BIOS) that is built into the ROM 55 or a bootloader in an embedded system is used to lead the system to start in order to lead the SDN system 20 to enter a normal running state. After the SDN system 20 enters a normal running state, the RAM 54 runs an application program and an operating system (OS) to receive data from the network or send data to the network, where the receiver 52 is configured to receive a data packet, the processor 51 is configured to instruct a switch to report the data packet to a corresponding controller according to a classification rule, where the controller generates a decision flow entry and delivers the decision flow entry to the switch, and the transmitter 53 is configured to forward a new flow according to the decision flow entry.

In this implementation manner, the processor 51 may be a central processing unit (CPU), or an application-specific integrated circuit (ASIC), or may be configured as one or more integrated circuits implementing this implementation manner of this application.

In the several implementation manners provided in this application, it should be understood that the disclosed system, apparatus, and method may be implemented in other manners. For example, the foregoing implementation manner of the described apparatus is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the implementation manners.

In addition, functional units in the implementation manners of this application may be integrated into one processing unit, or each of the units may exist alone physically, or two or more units are integrated into one unit. The foregoing integrated unit may be implemented in a form of hardware, or may be implemented in a form of a software functional unit.

The integrated unit may be stored in a computer-readable storage medium when the integrated unit is implemented in the form of a software functional unit and sold or used as an independent product. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the implementation manners of this application. The foregoing storage medium includes any medium that can store program code, such as a universal serial bus (USB) flash drive, a removable hard disk, a ROM, a RAM, a magnetic disk, or an optical disc.

The foregoing descriptions are merely implementation manners of this application, and are not intended to limit the scope of this application. An equivalent structural or equivalent process alternation made using the content of the specification and drawings of this application, or an application of the content of the specification and drawings directly or indirectly to another related technical field, shall fall within the protection scope of this application.

What is claimed is:

1. A method for processing a data packet by a switching device in a software defined network (SDN), the method comprising:
    establishing a first control channel with a first control device;
    establishing a second control channel with a second control device;
    receiving a first flow entry and a second flow entry, wherein the first flow entry comprises a first match field and a first identifier of the first control channel, wherein the second flow entry comprises a second match field and a second identifier of the second control channel, wherein the first identifier is different from the second identifier, and wherein the first match field is different from the second match field;
    receiving a first data packet and a second data packet;
    determining that the first data packet matches the first match field and that the second data packet matches the second match field;
    sending the first data packet to the first control device through the first control channel represented by the first identifier; and
    sending the second data packet to the second control device through the second control channel represented by the second identifier.

2. The method of claim 1, wherein before receiving the first flow entry and the second flow entry, the method further comprises:
    receiving a first request message to query the first identifier of the first control channel from the first control device;
    sending the first identifier to the first control device in response to the first request message;
    receiving a second request message to query the second identifier of the second control channel from the second control device; and
    sending the second identifier to the second control device in response to the second request message.

3. The method of claim 2, wherein the first request message is received from the first control device through the first control channel, wherein the first identifier is sent to the first control device through the first control channel, wherein the second request message is received from the second control device through the second control channel, and wherein the second identifier is sent to the second control device through the second control channel.

4. The method of claim 1, wherein priorities of the first flow entry and the second flow entry are the lowest among priorities of flow entries in a flow table stored by the switching device.

5. The method of claim 1, further comprising:
    establishing a third control channel with a third control device, wherein the first flow entry further comprises a third identifier of the third control channel, and wherein the third identifier of the third control channel is different from both the first identifier of the first control channel and the second identifier of the second control channel; and
    sending the first data packet to the third control device through the third control channel represented by the third identifier.

6. The method of claim 1, wherein the first identifier of the first control channel is one of a first logical port number of the switching device, a first physical port number of the switching device, or an identifier of a first network connection between the switching device and the first control device, and wherein the second identifier of the second control channel is one of a second logical port number of the switching device, a second physical port number of the switching device, or an identifier of a second network connection between the switching device and the second control device.

7. A switching device in a software defined network (SDN), comprising:
    a network interface; and
    a processor coupled to the network interface and configured to:
        establish a first control channel with a first control device;
        establish a second control channel with a second control device;

receive a first flow entry and a second flow entry, wherein the first flow entry comprises a first match field and a first identifier of the first control channel, wherein the second flow entry comprises a second match field and a second identifier of the second control channel, wherein the first identifier is different from the second identifier, and wherein the first match field is different from the second match field;

receive a first data packet;

send the first data packet to the first control device through the first control channel represented by the first identifier in response to the first data packet matching the first match field;

receive a second data packet; and send the second data packet to the second control device through the second control channel represented by the second identifier in response to the second data packet matching the second match field.

8. The switching device of claim 7, wherein before receiving the first flow entry and the second flow entry, the processor is further configured to:

receive a first request message to query the first identifier of the first control channel from the first control device;

send the first identifier of the first control channel to the first control device in response to the first request message;

receive a second request message to query the second identifier of the second control channel from the second control device; and send the second identifier of the second control channel to the second control device in response to the second request message.

9. The switching device of claim 8, wherein the processor is further configured to:

receive the first request message from the first control device through the first control channel;

send the first identifier to the first control device through the first control channel;

receive the second request message from the second control device through the second control channel; and send the second identifier to the second control device through the second control channel.

10. The switching device of claim 7, wherein priorities of the first flow entry and the second flow entry are the lowest among priorities of flow entries in a flow table stored by the switching device.

11. The switching device of claim 7, wherein the processor is further configured to:

establish a third control channel with a third control device, wherein the first flow entry further comprises a third identifier of the third control channel, wherein the third identifier is different from both the first identifier and the second identifier; and send the first data packet that matches the first match field to the third control device through the third control channel represented by the third identifier.

12. The switching device of claim 7, wherein both the first identifier and the second identifier are logical port numbers of the switching device.

13. The switching device of claim 7, wherein the first identifier is an identifier of a first network connection between the switching device and the first control device, and wherein the second identifier of the second control channel is an identifier of a second network connection between the switching device and the second control device.

14. The switching device of claim 7, wherein both the first identifier and the second identifier are physical port numbers of the switching device.

* * * * *